even though the grid of the multivibrator has varying charge rates due to the random voltage 6, the output pulses 11 and 12 will be at definite integral multiples of the wave A.

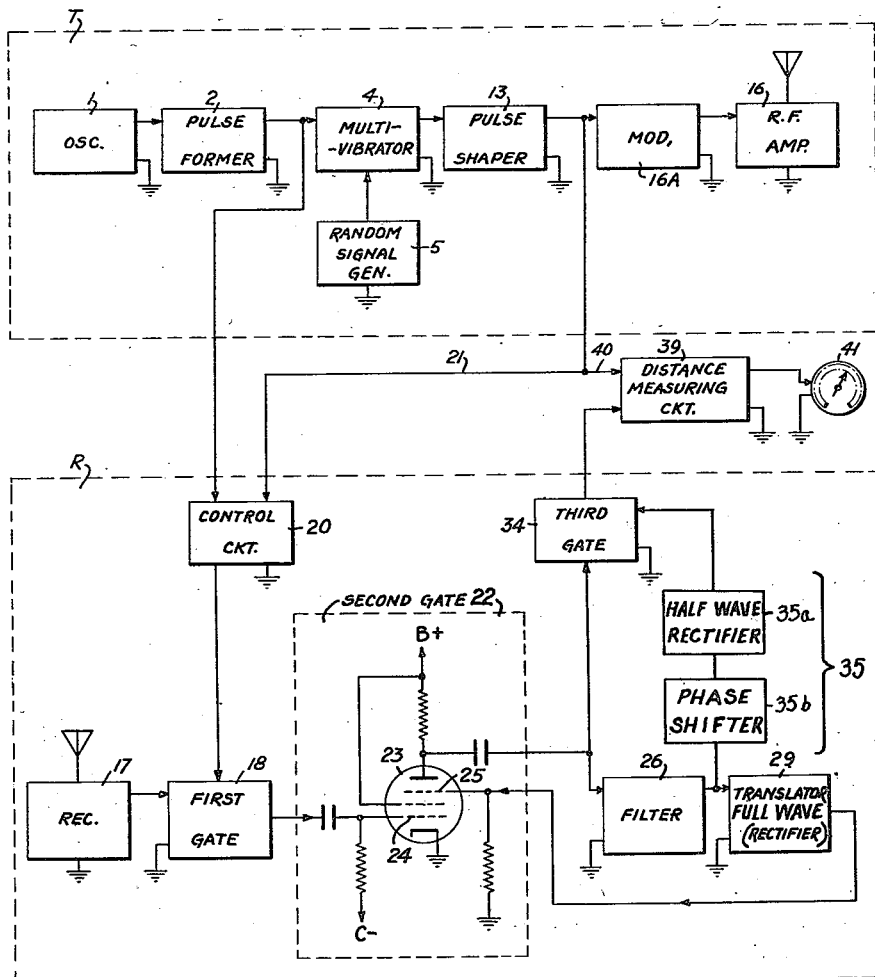

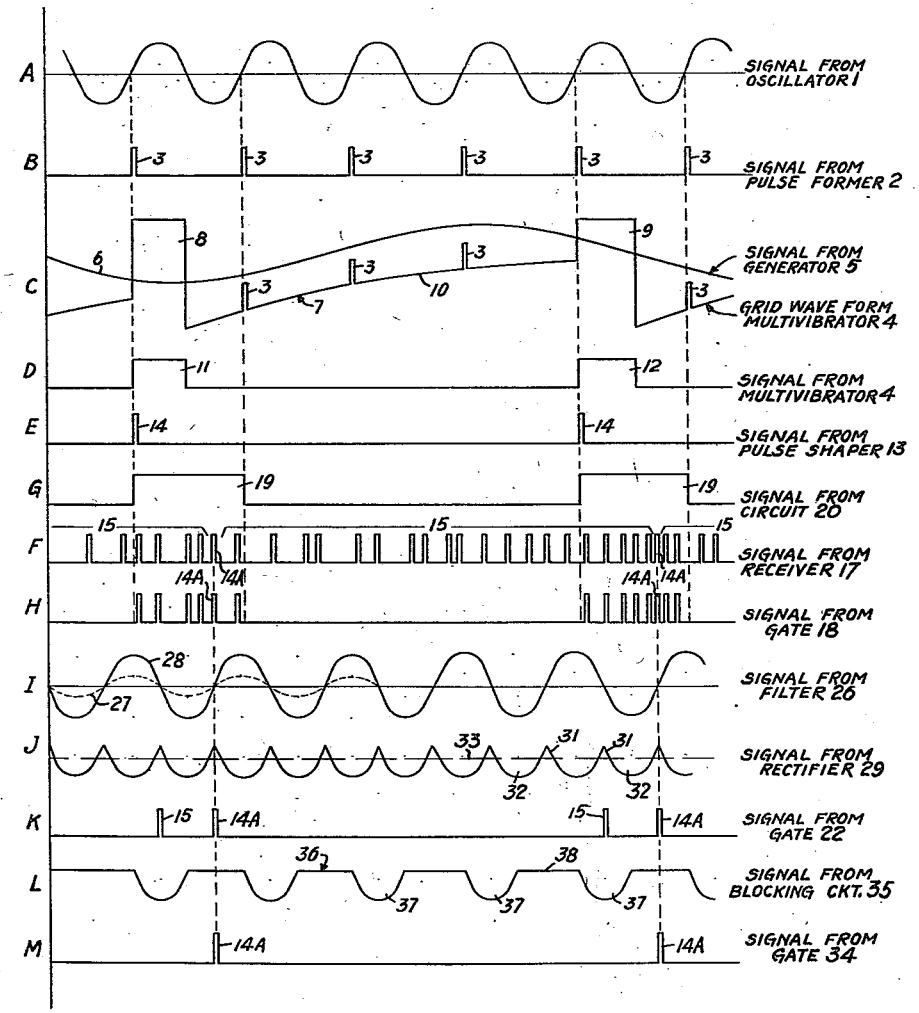

United States Patent Office 2,815,504
Patented Dec. 3, 1957

2,815,504
SELECTIVE GATE SYSTEM FOR RADAR BEACONS

Gilbert R. Clark, Nutley, N. J., assignor to International Telephone and Telegraph Corporation, a corporation of Maryland Application April 17, 1951, Serial No. 221,479

17 Claims. (Cl. 343—7.3)

This invention relates to radar beacon systems and more particularly to an interrogating unit for such systems.

Beacon interrogating units heretofore proposed usually include a transmitter for transmitting interrogating or challenge pulses to a beacon which is adapted to transmit reply signals or pulses which, for example, may be used for determining the distance and direction of the interrogator with respect to the beacon. In such systems there is generally only one reply signal received for each challenge or interrogation pulse because the reply pulse is transmitted on a different radio frequency channel from that used for interrogation signals. The usual reflection echos from various objects are thus rejected. However, interference caused by the challenge of other interrogators may cause numerous replies from the beacon but the timing of these reply signals with respect to the interrogation signals of any one interrogator will be erratic and out of synchronism with such interrogation signals.

One of the objects of this invention is to provide an interrogator unit for use in radar beacon systems to transmit interrogation pulses and to select from a train of random beacon reply pulses the particular beacon pulses replying to said interrogation pulses.

Another object of the invention is to provide an interrogation unit for radar beacon systems capable of transmitting randomly timed interrogation pulses and to select from a train of random beacon reply pulses the particular beacon pulses replying to said randomly timed interrogation pulses.

Still another object of the invention is to provide a pulse selector or gating circuit for selecting a given series of pulses from a train of random pulses, which includes such series of pulses, wherein the periods of the gating operations are of long duration initially and which gradually narrow down in duration to include the desired pulses to substantially the exclusion of all other pulses.

Briefly, the interrogation unit comprises a transmitter for transmitting a series of interrogation pulses having timing periods preferably equal to integral multiples of the wavelengths of a given reference frequency, a receiver to receive beacon reply pulses, a selector gate circuit to select from a received train of random pulses those beacon reply pulses corresponding to the transmitted series of interrogation pulses, the gate circuit being controlled by said series of pulses to pass received signals during time intervals the initial duration of which is such as to include desired reply pulses and unwanted pulses that may occur adjacent thereto, and means to produce, in response to the periodic gating reception of pulses, a control potential for application to the gate circuit to automatically narrow down the operating intervals of the gate circuit to substantially the duration and timing of the desired pulses.

The selector gate circuit may include two or more gating functions. The first gating function may be controlled directly by pulse energy from the series of pulses produced for transmission, suitably shaped to provide gate operating periods to include a desired time interval following transmission of each interrogation pulse. These gate operating period intervals pass pulses of the train of random pulses received at the interrogator to a filter tuned sharply to the reference frequency on which the transmitted pulses are based. The desired pulses impart energy to the filter at time intervals which are integrally related to the natural period of the filter, thus resulting in a cumulative oscillation build-up in the filter. The output energy of the filter is shaped and the resulting voltage is fed back to the gate as a blocking potential to narrow down the duration of the operating period thereof. As the interrogating operation continues the gating operation is gradually narrowed down to substantially the duration and timing of the desired reply pulses. The transmission timing of interrogation pulses and the selection of the pulses in reply thereto are used to control the distance indicator.

The above-mentioned and other features and objects of this invention and the manner of attaining them will become more apparent and the invention itself will be best understood by reference to the following description of an embodiment of the invention taken in conjunction with the accompanying drawings, wherein:

Figure 1 is a schematic block diagram of a distance measuring system incorporating the features of my invention; and Figure 2 is a graphic representation of the various wave forms used in explaining the operation of the system of Fig. 1.

Referring to Figs. 1 and 2, the transmitter section T of the interrogator unit has a stable oscillator 1 to provide a source of higher stabilized oscillations as a given reference frequency, for example, 800 cycles per sec., the wave form thereof being represented by wave A, Fig. 2. This wave is applied to a pulse forming circuit 2 of known type which produces a train B of pulses 3. The pulses 3 occur at regularly timed intervals of one per each period of the oscillation frequency of oscillator 1. These pulses are applied to a multivibrator frequency division circuit 4 which has a relatively long time constant equal to a plurality of cycles of the output wave of oscillator 1. This multivibrator may be of the one-shot multivibrator type so that upon triggering to one condition it will remain in that condition for a short period of time after which it will return to its normal condition. The return timing is not critical so long as it occurs in a relatively short period of time compared with the ultimate interrogation pulse spacing. The multivibrator is preferably biased so that it will not retrigger except at the point of application of one of the pulses 3.

A random signal generator 5 is provided to inject a varying voltage into the retriggering circuit and thereby to vary the effective rise-time of the grid voltage applied to the triggering grid of the multivibrator 4. This signal may be of a very low frequency and random in nature as indicated by curve 6 in graph C, Fig. 2. The resulting voltage on the triggering grid of the multivibrator will take the form of curve 7, wherein there is shown two pulses 8 and 9 indicating periods of operation of the multivibrator and the pulses 3 appearing intermediate these pulses on the increasing voltage of the grid as shown at 10. The pulses 8 and 9 will appear as output pulses 11 and 12 shown in graph D, and after passing through a pulse shaper network 13 will have a desired short duration form, such as indicated at 14. The shaper network may include a differentiating and clipper circuit of known form. The pulses 14, graph E, are thus timed with selected ones of the pulses 3 at integral multiples of the period of the wave A. The timing interval between pulses 14 however may be varied by any number of periods dependent upon the value of the random signal 6 from generator 5. These pulses 14 may be considered as randomly selected ones of the pulses 3.

These randomly selected pulses are applied to a modulator 16A for transmission through R. F. amplifier 16. Beacon reply signals are received at the receiver 17 of the receiver section R to demodulate the received carrier and thereby produce the reply pulses. The output of receiver 17 consists of a train F of random pulses which includes wanted reply pulses 14A and usually a plurality of unwanted reply pulses 15. The output pulses from receiver 17 are then applied to a selector gate circuit which includes a first normally blocked input gate 18. The circuit of the gate 18 is biased so that in the absence of releasing or unblanking pulses it will not pass the pulses 14A and 15. The unblanking pulses 19 shown in graph G are derived from a control circuit 20. This may be in the form of an Eccles-Jordan type trigger circuit which is triggered into releasing condition by the randomly selected pulse 14 applied from the pulse shaper 13 over line 21, and is returned to its blocking condition by the next succeeding output pulse from the pulse former 2 applied to circuit 20. The pulses 19 from circuit 20 are each of a duration equal to one full period of the wave A or of the pulses 3. These pulses 19 are applied to gate circuit 18 which in turn passes groups of pulses received during the duration of the pulses 19, as shown in graph H, on to a second selector gate 22.

The circuit of the gate 22 may include, for example, a pentode tube 23 biased normally to pass the pulses applied thereto from the gate 18. The bias is maintained on the tube 23 from a normally negative source by which the control grid 24 is maintained at the desired negative bias so that only pulses of a predetermined amplitude may pass, thereby cutting out low amplitude noise which may exist between the pulses 14A and 15. As indicated, these pulses 14A and 15 are preferably limited in amplitude in receiver 17 so that higher impulse noise signals will be limited before being applied to the gate.

Coupled to the output of the gate 22 is a low loss filter 26 which is tuned sharply to the same frequency as oscillator 1, for example, 800 cycles per second. The wanted pulses 14A tend to build up a sinusoidal wave in filter 26 since they are properly timed at integral multiples of the wavelength or period of the frequency to which filter 26 is tuned. The other pulses 15 being randomly timed with respect to this frequency do not tend to build up the oscillation. Thus, at the output of filter 26 will appear a sine wave similar to that shown in graph I. The phase of oscillations 27 and 28 corresponds to the phase of pulses 14A as depicted in Fig. 2. Filter 26 preferably includes a phase-shifting device to achieve this phase relationship. The wave initially may be of a low amplitude as shown at 27 but will gradually build up to its maximum amplitude as indicated at 28. The output of filter 26 may be full-wave rectified in translator 29 to provide a rectified voltage such as shown in graph J. This rectified voltage is fed back over line 30 to the suppressor grid 25 of tube 23. If desired, there may be an exchange of the signals applied to control grid 24 and suppressor grid 25. For example, grid 24 may be connected through an impedance to ground thus maintaining grid 25 at a normally negative bias.

Turning to graph J it will be seen that the cusps 31 of the rectified wave are at zero voltage whereas the intervening portions 32 are negative. This negative portion applied to grid 25 will serve to block the gate tube 23 at its intermediate portions so that the gate is closed during the intervals corresponding to the levels below the critical level 33 of graph J. It will be realized that as the wave is built up in the output of filter 26 this blocking action will be gradually extended until the unblocking will occur at only those points corresponding to the cusps 31, only two of which come within each interval determined by the pulses 19 of trigger circuit 20. Thus, the gate circuit 22 is accordingly narrowed in its operating intervals as the successive wanted pulses 14A are received so that substantially all of the unwanted pulses 15 are eliminated.

While gate 22 will remove most of the unwanted pulses it is clear that in certain conditions where interfering pulses occur during the second cusping period which is not timed with the wanted pulse, some interference may still be passed. Thus, the output of circuit 22 may be in accordance with the form of graph K wherein the wanted pulses 14A are shown together with an occasional unwanted pulse 15. In order to eliminate such unwanted pulses as might pass gate 22 a third gate 34 may be provided. This gate is arranged to be blocked during intervals corresponding to the occurrence of the unwanted one of the cusps 31. To accomplish this a blocking circuit 35 is provided coupled to the output of filter 26. This circuit includes a phase shifter 35b to produce a 90° phase shift for the sine wave 28 which may be utilized as the blocking potential for gate 34. Preferably, the wave 28 is also half wave rectified at 35a to produce a blocking wave 36, graph L. The output gate 34 will therefore be closed to the passage of pulses during application thereto of the negative wave portions 37. As a result, pulses 14A only are normally passed by the gate circuit 34 as shown by graph M.

In order to obtain an indication of the distance measurement of the interrogator from the beacon, a distance measuring circuit 39 is provided. This distance measuring circuit is triggered into operation at the time the pulses are transmitted by applying the randomly selected pulses 14 from pulse shaper 13 over connection 40 to the measuring circuit 39. The output pulses 14A from gate 34 are applied to trigger the distance measuring circuit back into its inoperative condition so that it will be operated for a time interval equivalent to the time of pulse transmission and return, which corresponds substantially to the distance of the interrogator from the beacon. A meter 41 may be coupled to the distance measuring circuit to provide a direct indication of the distance measurements.

It will be clear from the above description that the selector gating circuit in accordance with this invention provides a system for selecting substantially only those pulses properly timed for distance measuring purposes. However, during the initial period of operation, the selector gate circuit is sufficiently wide so as to admit the wanted pulses regardless of their timing position with respect to the transmitted pulses. When the wanted pulses are present, however, the gating circuit will be selectively narrowed until substantially only the wanted pulses are selected to the exclusion of other signals. The only unwanted pulses which can pass through the selector gate circuit are those which might occur in the narrow time interval corresponding to the peaks of cusps 31. Such unwanted pulses may be so closely timed with respect to the wanted pulses that they are substantially coincident therewith and, therefore, will not produce any serious error in the distance measurements obtained.

It is, of course, essential that filter 26 be precisely tuned with respect to oscillator 1. One form of such filter may comprise a known form of vibrating reed or tuning fork filter. Since the frequency being dealt with is relatively low, it is difficult to provide capacitive and inductive type filters of the conventional form which will be sufficiently selective. However, another form of filter may be used, for example, the one disclosed in my copending U. S. application Serial No. 664,484, filed April 24, 1946, now Patent No. 2,584,986, would be quite satisfactory. While these two types of filters have been specifically recited it will be clear to those skilled in the art that any filter of a known type which can be sufficiently sharply tuned may be used.

While I have described above the principles of my invention in connection with specific apparatus, it is to

I claim:

1. In a beacon system, an interrogator unit comprising a transmitter for transmitting a series of interrogation pulses having timing periods equal to integral multiples of the wavelength of a given frequency, a receiver to receive beacon reply pulses, a selector gate circuit coupled to said receiver to select from a received train of random pulses those beacon reply pulses corresponding to said series of interrogation pulses, means under control of said transmitter for controlling the operating intervals of said gate circuit to pass portions of the train of random pulses received in accordance with the periodicity of said series of interrogation pulses, the duration of said gate operating interval initially being considerably greater than the duration of a pulse of said series, a filter tuned sharply to said given frequency coupled to the output of said gate circuit, whereby oscillatory energy tends to build up in said filter in response to pulses received during such intervals, means to translate said energy into control potential and means to apply said control potential to said gate circuit to narrow the duration of the operating intervals of said gate circuit.

2. In a beacon system according to claim 1, wherein the transmitter includes a source of pulses having a repetition rate in accordance with said given frequency and means to select randomly certain of said pulses so that the time spacing therebetween varies by integral multiples of the wavelength of said given frequency.

3. In a beacon system, an interrogator unit comprising a transmitter for transmittnig a series of interrogation pulses having timing periods equal to integral multiples of the wave-length of a given frequency, said transmitter comprising a source of pulses having a repetition rate in accordance with said given frequency and means to select randomly certain of said pulses so that the time spacing therebetween varies by integral multiples of the wavelength of said given frequency, a receiver to receive beacon reply pulses, a selector gate circuit coupled to said receiver to select from a received train of random pulses those beacon reply pulses corresponding to said series of interrogation pulses, means controlling the operating intervals of said gate circuit to pass portions of the train of random pulses received in accordance with the periodicity of said series of interrogation pulses, the duration of said gate operating interval initially being considerably greater than the duration of a pulse of said series, a filter tuned sharply to said given frequency coupled to the output of said gate circuit, whereby oscillatory energy tends to build up in said filter in response to pulses received during such intervals, means to translate said energy into control potential and means to apply said control potential to said gate circuit to narrow the duration of the operating intervals of said gate circuit, said means to select comprising a source of random signals and a multivibrator adapted to be controlled by the combined energy of said random signals and the pulses of said source.

4. In a beacon system, an interrogator unit comprising a transmitter for transmitting a series of interrogation pulses having timing periods equal to integral multiples of the wavelength of a given frequency, a receiver to receive beacon reply pulses, a selector gate circuit coupled to said receiver to select from a received train of random pulses those beacon reply pulses corresponding to said series of interrogation pulses, means controlling the operating intervals of said gate circuit to pass portions of the train of random pulses received in accordance with the periodicity of said series of interrogation pulses, the duration of said gate operating interval initially being considerably greater than the duration of a pulse of said series, a filter tuned sharply to said given frequency coupled to the output of said gate circuit, whereby oscillatory energy tends to build up in said filter in response to pulses received during such intervals, means to translate said energy into control potential and means to apply said control potential to said gate circuit to narrow the duration of the operating intervals of said gate circuit, said selector gate circuit comprising a first gate controlling the output of said receiver, a control circuit for said gate responsive to said interrogation pulses and to selected beacon reply pulses to provide a control voltage for said gate to determine the occurrence of said gate operating intervals.

5. In a beacon system according to claim 4, wherein said control circuit includes a trigger circuit and means to apply energy of said interrogation pulses to trip said trigger circuit from one state of operation to a second state of operation and means to apply energy of said selected beacon reply pulses to trip said trigger circuit from said second state of operation back to said one state of operation.

6. In a beacon system according to claim 4, wherein said selector gate circuit includes a second gate, means to apply the control potential produced by the translating means to said second gate to render the gate operating interval thereof smaller than the gate operating interval of said first gate.

7. In a beacon system according to claim 6, wherein said second gate includes an electron discharge device having anode, grid, suppressor grid and cathode electrodes, the output of said first gate being coupled to said grid electrode, said anode electrode being coupled to said filter and the output of said translating means is coupled to said suppressor grid electrode.

8. In a beacon system according to claim 7, wherein the translating means includes a full-wave rectifier to produce cusp-like control potentials, two of said cusps for each cycle of said oscillatory energy, the cusp potentials being utilized to control the opening of said second gate.

9. In a beacon system according to claim 8, wherein said selector gate circuit includes a third gate connected to the anode of said electron discharge device of said second gate and a phase shifter connected to the output of said filter and the output of said phase shifter coupled to said third gate whereby the phase shifted energy blocks said third gate during the occurrence of alternate ones of said cusps.

10. In a beacon system according to claim 1, wherein the translating means includes a full-wave rectifier to produce cusp-like control potentials, two of said cusps for each cycle of said oscillatory energy, the cusp potentials being utilized to control said gate operating intervals.

11. In a beacon system according to claim 10, further including means to block the operating effect of one of the cusps of said control potential.

12. A pulse selector system for selecting a given series of pulses from a train of random pulses which includes said series of pulses, said given series of pulses having timing periods equal to integral multiples of the wavelength of a given frequency, comprising a selector gate circuit, means controlling the operating intervals of said gate circuit to pass portions of said train in accordance with the periodicity of said series of pulses, the duration of said gate operating intervals initially being considerably greater than the duration of a pulse of said series whereby one or more pulses may be passed during each gating operation, a filter tuned sharply to said given frequency coupled to the output of said gate circuit, whereby oscillatory energy of said given frequency tends to build up in said filter in response to pulses of substantially said timing periods, and means to translate said oscillatory energy into control potential and means to apply said control potential to said gate circuit to reduce said gate operating intervals, said translating means comprising a full-wave rectifier to produce cusp-like control potentials, two of said cusps for each cycle of said oscillatory energy, the cusp potentials being utilized to control the opening of said second gate.

13. A pulse selector system according to claim 12, further including means to block the operating effect of alternate ones of said cusp potentials.

14. In a beacon system, an interrogator unit comprising a transmitter for transmitting a series of interrogation pulses having timing periods equal to integral multiples of the wavelength of a given frequency, a receiver to receive beacon reply pulses, a selector gate circuit coupled to said receiver to select from a received train of random pulses those beacon reply pulses corresponding to said series of interrogation pulses, means controlling the operating intervals of said gate circuit to pass portions of the train of random pulses received in accordance with the periodicity of said series of interrogation pulses, the duration of said gate operating interval initially being considerably greater than the duration of a pulse of said series, a filter tuned sharply to said given frequency coupled to the output of said gate circuit, whereby oscillatory energy tends to build up in said filter in response to pulses received during such intervals, means to translate said energy into control potential and means to apply said control potential to said gate circuit to narrow the duration of the operating intervals of said gate circuit, said selector gate circuit comprising a first gate controlling the output of said receiver, a control circuit for said gate responsive to said interrogation pulses and to selected beacon reply pulses to provide a control voltage for said gate to determine the occurrence of said gate operating intervals.

15. A pulse selector system according to claim 14, wherein said selector gate circuit includes a second gate comprising an electron discharge device having anode, grid, suppressor grid and cathode electrodes, said grid electrode being coupled to the output of said first gate, the anode being coupled to said filter, and said suppressor grid being coupled to the output of the translating means.

16. A pulse selector system according to claim 15, wherein the translating means includes a full-wave rectifier to produce cusp-like control potentials, two of said cusps for each cycle of said oscillatory energy, the cusp potentials being utilized to control the opening of said second gate.

17. A pulse selector system according to claim 16, wherein said selector gate circuit includes a third gate connected to the anode of said device and a phase shifter connected to the output of said filter and the output of said phase shifter being coupled to said third gate whereby the phase shifted energy blocks said third gate during the occurrence of alternate ones of said cusps.

References Cited in the file of this patent

UNITED STATES PATENTS

| | | |
|---|---|---|
| 2,277,000 | Bingley | Mar. 17, 1942 |
| 2,425,314 | Hansell | Aug. 12, 1947 |
| 2,490,039 | Earp | Dec. 6, 1949 |
| 2,499,225 | Marshall | Feb. 28, 1950 |
| 2,531,412 | Deloraine | Nov. 28, 1950 |